(12) United States Patent
Whitworth et al.

(10) Patent No.: US 8,036,909 B2
(45) Date of Patent: Oct. 11, 2011

(54) SYSTEM, METHOD, AND APPARATUS FOR COLLABORATIVE WATERSHED RESTORATION PROJECTS

(75) Inventors: Joe Sterling Whitworth, Portland, OR (US); Brett Evan Brownscombe, Portland, OR (US); Alan James Horton, Portland, OR (US); Mark Lindsey McCollister, Portland, OR (US); Matthew Wayne Tunnell, Vancouver, WA (US); Jason Lee Rush, Vancouver, WA (US)

(73) Assignee: The Freshwater Trust, Portland, OR (US)

( * ) Notice: Subject to any disclaimer, the term of this patent is extended or adjusted under 35 U.S.C. 154(b) by 896 days.

(21) Appl. No.: 11/970,885

(22) Filed: Jan. 8, 2008

(65) Prior Publication Data

US 2009/0144116 A1     Jun. 4, 2009

Related U.S. Application Data

(60) Provisional application No. 60/992,257, filed on Dec. 4, 2007.

(51) Int. Cl.
*G06Q 10/00* (2006.01)
(52) U.S. Cl. .......................................... 705/1.1; 705/301
(58) Field of Classification Search ............... 705/1, 1.1, 705/301
See application file for complete search history.

(56) References Cited

U.S. PATENT DOCUMENTS

| | | | |
|---|---|---|---|
| 5,893,082 A | 4/1999 | McCormick | |
| 6,581,040 B1 | 6/2003 | Wright et al. | |
| 6,856,907 B2 | 2/2005 | Rosenblum | |
| 7,305,392 B1 * | 12/2007 | Abrams et al. | 707/9 |
| 2004/0039621 A1 | 2/2004 | Wood et al. | |
| 2005/0273358 A1 | 12/2005 | Zimmerman | |
| 2006/0143103 A1 | 6/2006 | Denne et al. | |
| 2007/0219840 A1 | 9/2007 | Rabb | |

OTHER PUBLICATIONS

Chesapeake Bay Program's, "Chesapeake 2000 Stream Corridor Restoration Goals Workshop", The Scientific and Advisory Committee, May 7, 2003.*

"Geographic Information Systems as an Integrating Technology: Context, Concepts, and Definitions", Kenneth E. Foote and Margaret Lynch, Department of Geography, University of Texas at Austin, 2000.*

\* cited by examiner

*Primary Examiner* — Janice A. Mooneyham
*Assistant Examiner* — Heidi Riviere
(74) *Attorney, Agent, or Firm* — Schwabe Williamson & Wyatt

(57) ABSTRACT

Embodiments of the present invention provide for systems, apparatuses, and methods for collaborative watershed restoration projects, which may include one or more restoration actions involving a variety of different stakeholders that, when completed, provides a positive contribution to the ecological health of at least one watershed. The identified restoration actions may be a comprehensive list of actions recognized as addressing limiting factors that may exist in a watershed. Ecological outcomes may drive stakeholder involvement in collaborative watershed restoration projects. While the system provides transparency to the projects that are being funded, stakeholder confidence may benefit from additional assurances provided through a certification that the projects are satisfactorily completed.

19 Claims, 8 Drawing Sheets

SYSTEM, METHOD, AND APPARATUS FOR COLLABORATIVE WATERSHED RESTORATION PROJECTS

CROSS REFERENCE TO RELATED APPLICATIONS

The present application claims priority to U.S. Provisional Patent Application No. 60/992,257, filed Dec. 4, 2007, entitled "SYSTEM, METHOD, AND APPARATUS FOR COLLABORATIVE WATERSHED RESTORATION PROJECTS," the entire disclosure of which is hereby incorporated by reference in its entirety.

TECHNICAL FIELD

Embodiments of the present invention relate to the field of environmental restoration and, in particular, to collaborative watershed restoration projects.

BACKGROUND

Healthy freshwater ecosystems across the globe are disappearing at an alarming and dangerous rate. Increasing pressures are continually asserted upon these already stressed and damaged ecosystems. Much of this loss, at least in the United States, occurs on privately owned lands. While public and private funding exists to assist private landowners (PLOs) in restoring these ecosystems, the bureaucracy and direct costs associated with accessing this assistance creates a strong disincentive to action. Furthermore, watershed restoration projects typically take specialized knowledge to conceive, design, implement, and certify. These hurdles may be, or may appear to be, insurmountable for a large number of PLOs. As a result, many otherwise viable restoration projects go undone.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrases "A/B" and "A and/or B" mean (A), (B), or (A and B). For the purposes of the present invention, the phrase "A, B, and/or C" means (A), (B), (C), (A and B), (A and C), (B and C), or (A, B, and C). For the purposes of the present invention, the phrase "(A)B" means (B) or (A and B), that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention describe systems, methods, and apparatuses for use in collaborative watershed restoration projects. A collaborative watershed restoration project, as used herein, may include one or more restoration actions involving a variety of different stakeholders that, when completed, provides a positive contribution to the ecological health of at least one watershed.

Embodiments of the present invention will be primarily described in the context of collaborative watershed restoration projects. However, other embodiments may include other environmentally restorative projects and/or collaborative projects utilizing the teachings described herein.

Figure 1:
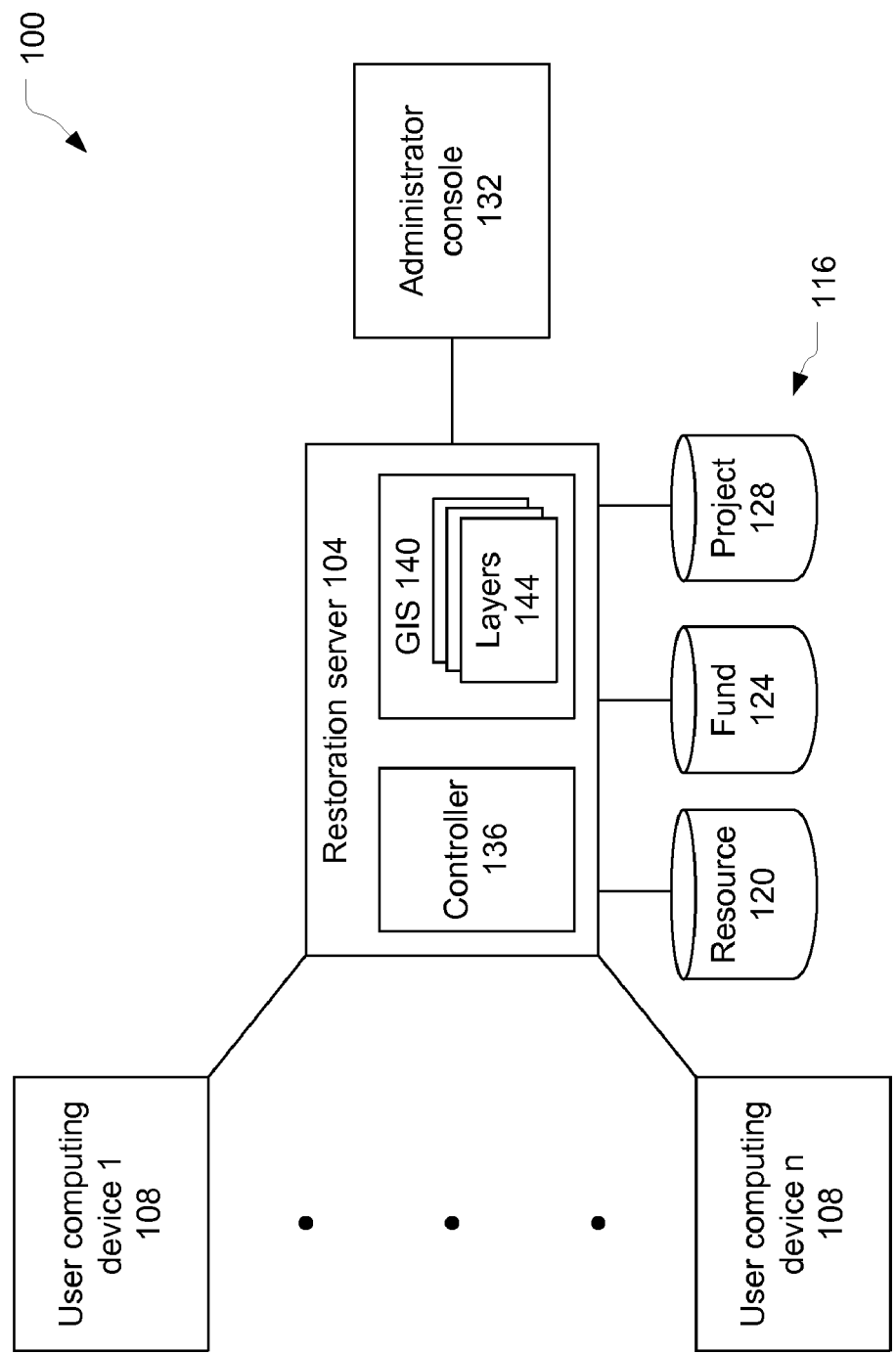
FIG. 1 illustrates a system for facilitating collaborative watershed restoration projects in accordance with various embodiments of the present invention.

FIG. 1 illustrates a system 100 for facilitating collaborative watershed restoration projects (hereinafter "projects") in accordance with various embodiments of the present invention. The system 100 may include a restoration server 104 remotely coupled to a number of user computing devices 108. The user computing devices 108 may function as portals for various stakeholders to participate in the projects. In an embodiment, the remote coupling of the restoration server 104 to the user computing devices 108 may take place over a public network, e.g., over the Internet, to facilitate stakeholder access. As will be readily understood, a variety of security mechanisms may be employed to secure and authenticate access to the restoration server 104 over a public network. In other embodiments, alternative networks or access mechanisms may be utilized to link user computing devices 108 with restoration server 104.

The restoration server 104 may be locally coupled to a number of databases 116. The databases 116 may include a resource database 120, a fund database 124, and a project database 128 to store a variety of information as will be discussed in further detail below. These databases may be physically distinct or logically distinct databases. Briefly, the resource database 120 may primarily include resource information about various resources that may be employed in the implementation and/or design of the projects; the fund database 124 may primarily include fund information about funds that may be contributed to the projects or portions thereof; and the projects database 128 may primarily include project information related to the projects themselves.

The restoration server 104 may also be locally coupled to an administrator console 132 for initial configuration and subsequent maintenance and operation of the restoration server 104 and databases 116.

The local coupling of the restoration server 104 to the databases 116 and/or administrator console 132 may take place by a direct wired/wireless connection or over a private network, e.g., a local area network (LAN).

In various embodiments, one or more of the user computing devices 108 may be locally coupled to the restoration server 104 while one or more of the databases 116 and/or the administrator console 132 may be remotely coupled.

The restoration server 104 may include one or more computing devices cooperatively coupled to one another to perform project processes described herein. The restoration server 104 may include a controller 136 and a geographical information system (GIS) 140. The GIS 140 may include a number of layers 144 that may be used as organizational overlays for the underlying information stored in the databases 116. The layers 144 may be used to correlate the underlying information with various geographical locations.

Figure 2:
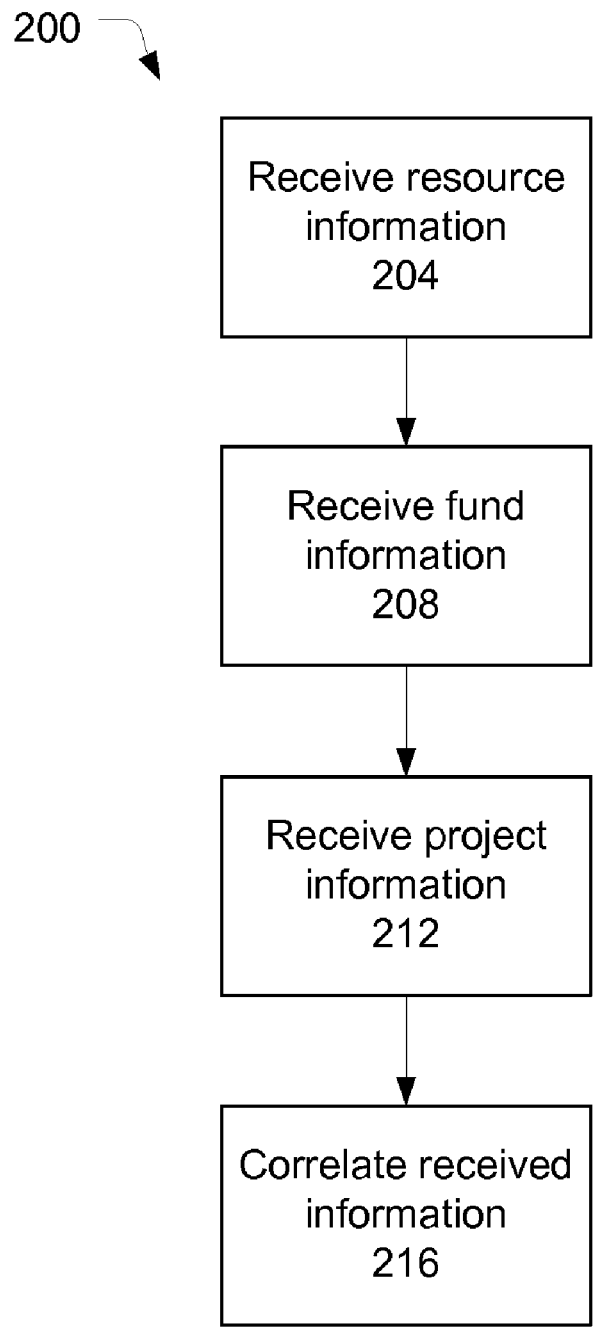
FIG. 2 is an operational flowchart illustrating initial configuration of the system in accordance with various embodiments of the present invention.

FIG. 2 is an operational flowchart 200 illustrating initial configuration of the system 100 in accordance with various embodiments of the present invention. Generally, an administrator may utilize the administrator console 132 to configure the system 100 by populating the databases 116 with the desired information. The desired information may be received from user computing devices 108; other online sources (e.g., other sources coupled to the system 100 via the public network); and/or offline sources (e.g., sources coupled directly to the system 100 or a user interface of the administrator console 132, itself).

At block 204, the controller 136 may receive resource information and store the resource information in the resource database 120. Resource information may be information on local technical, educational, and/or professional resources that may be used in design and/or implementation of the projects.

In various embodiments, these resources may include, but are not limited to, local watershed councils, Soil and Watershed Conservation Districts (SWCDs); Natural Resources Conservation Services (NRCSs); 4-H and Extension programs; and/or other on-the-ground state, federal, tribal, and/or private resources.

These resources may include project coordinators. A project coordinator may be someone with training/knowledge of the project processes of the system 100, e.g., general knowledge of funding criteria, jurisdiction and permit requirements of various regulatory agencies, etc. The project coordinator may also have additional training/knowledge related to ecological systems/processes of watersheds to facilitate knowledgeable design, implementation, and/or certification of the projects.

These resources may also include contractors capable of designing and/or implementing various aspects of the restoration projects and/or volunteers to facilitate the design and/or implementation. Volunteer resources may come from educational institutions, e.g., local schools with teachers interested in field-based stewardship learning opportunities, students undertaking service-learning projects, etc. and/or from others willing to donate resources as appropriate.

At block 208, the controller 136 may receive fund information and store the fund information in the fund database 124. The fund information may include information on funds made available for projects from a number of public and private funding sources. These funding sources may include, but are not limited to, governmental agencies, municipalities, private investors, corporations, charitable institutions, non-profit organizations, individuals, etc.

The fund information may include funding criteria associated with the funds. Funding criteria may be used to target funds to support projects/actions desired by the particular funding source. Funding criteria may include matching fund components (e.g., desired ratios, cost-shares, etc.), landowner eligibility, geographical location eligibility (e.g., only geographical locations in riparian zones), watershed restoration action eligibility (e.g., actions tied to desired biological outcomes), timelines, reporting requirements, etc.

In some embodiments, the funds may be available and ready for distribution pending satisfaction of the given funding criteria. These funds may be provided to the system 100 through block grants or other methods to be readily available for financing approved projects, thereby shortening funding cycles typically associated with restoration projects.

At block 212, the controller 136 may receive project information and store the project information in the project database 128. The project information may include identification of various factors that limit watershed recovery ("limiting factors") along with specific restoration actions configured to address these limiting factors. In some embodiments, limiting factors may relate to stream flow, habitat diversity, temperature, etc.

In some embodiments, the limiting factors may be specifically identified by a conservation entity and/or regulatory agency in watershed assessments pertaining to specific watersheds. These watershed assessments may exist in report form and may be manually entered by the administrator through the administrator console 132.

In some embodiments, the limiting factors may be generally identified as associated with particular geographical features.

In some embodiments, limiting factors and/or associated restoration actions may be submitted directly by users through user computing devices 108. For example, a user (e.g., a conservation agent, private landowner (PLO), project coordinator, member of the public, etc.) may submit observed conditions, e.g., a point or non point source pollutant, to the system 100 as a limiting factor. This submission may be subject to verification by the administrator and/or other stakeholders, e.g., local coordinator, agency representative, etc.

Many restoration actions that address limiting factors may be organized into four categories: general restoration actions; instream actions; habitat reconnection actions; and road improvement actions. General restoration actions may include, but are not limited to, riparian fencing, riparian replanting, livestock management (e.g., rest-rotation strategy, grazing strategy, off-channel watering, etc.), conifer conservation, invasive weed removal, and bank restoration. Instream work restoration actions may include, but are not limited to, natural large wood placement, boulder placement, and meander. Habitat reconnection restoration actions may include, but are not limited to, culverts, estuarine, reconnect existing side channels and alcoves. Road improvement restoration actions may include, but are not limited to, road alteration and road removal. Many of these watershed restoration actions are directed toward restoring the native form and function of the watershed (e.g., invasive weed removal, instream work, and habitat reconnection); while others are directed towards reducing adverse effects of human activities (e.g., agricultural operations).

The project information may also include permitting information related to the projects. Permitting information may include details about permit applications required by regulatory agencies for implementing a particular restoration action.

The contents of the fund information, resource information, and/or project information and how they will be used in the projects may be discussed in further detail with respect to more specific contexts presented below.

At block 216, the controller 136 may correlate the information received at blocks 204, 208, and 212. In some embodiments, this correlation may be performed, at least in part, through generation of the GIS layers 144. For example, a resource GIS layer may be generated to correlate the resource information to various geographical locations; a fund GIS layer may be generated to correlate the fund information and, in particular, the funding criteria of the funding sources to various geographical locations; and a project GIS layer may be generated to correlate the project information and, in particular, the limiting factors, to various geographical locations.

In other embodiments, other information related to design and/or implementation of the projects may be collected, stored, and correlated in a similar manner. For example, in one embodiment, information on endangered species may be collected with a corresponding GIS layer being constructed to correlate the endangered species information to various geographical locations.

Thus configured, the system 100 is ready to facilitate a user-driven and/or user-initiated project.

Figure 3:
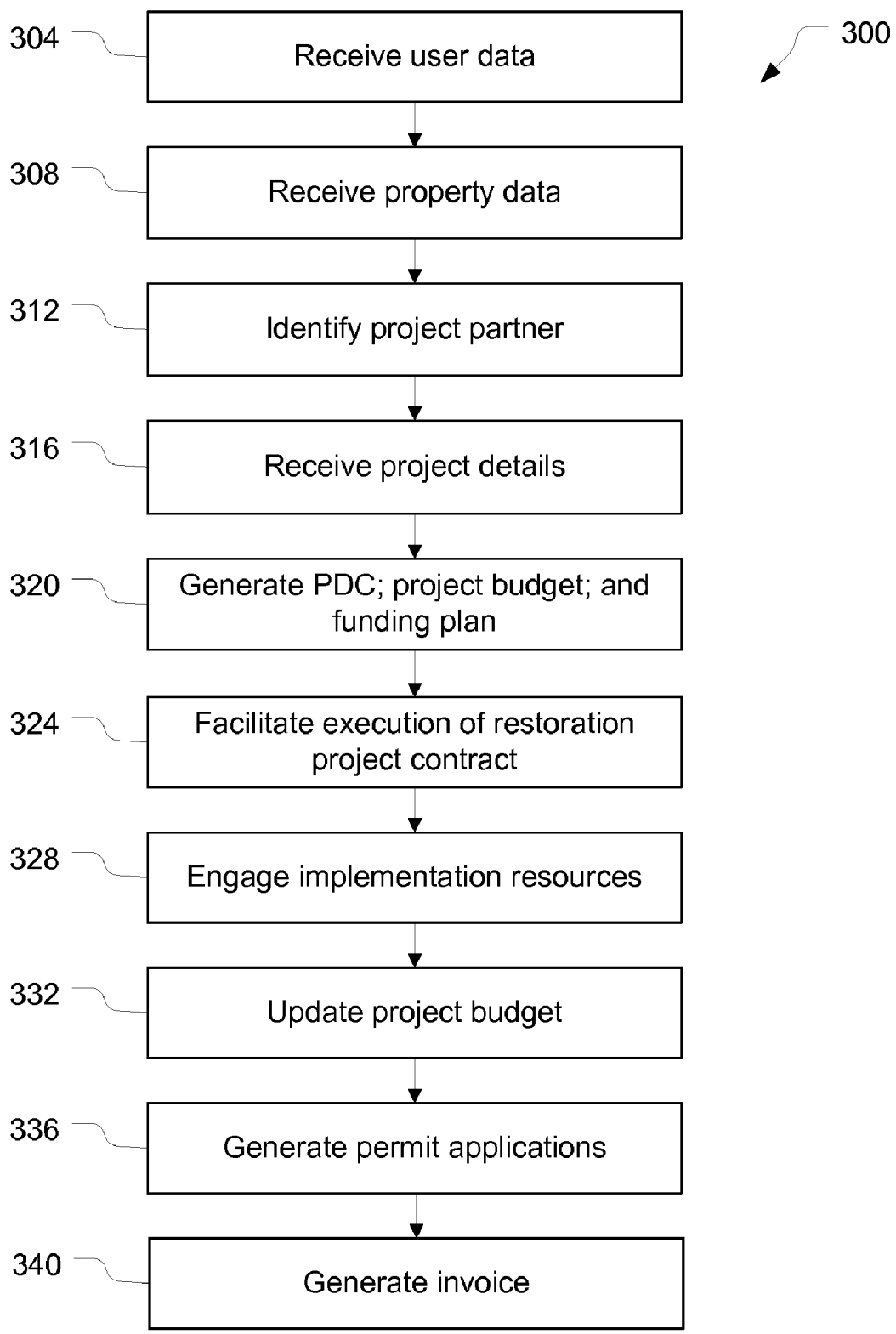
FIG. 3 is an operational flowchart illustrating project operations in accordance with various embodiments of the present invention.

FIG. 3 is an operational flowchart 300 illustrating restoration server 104 operations of a project in accordance with various embodiments of the present invention. At block 304, the controller 136 may receive user data identifying a user to the system 100. The user, for purposes of the present embodiment, may be either a PLO (which may include a PLO's authorized representative) or a project coordinator. The receipt of user data may be done through a registration/login process.

Unless otherwise specified, user interaction with the restoration server 104 may take place through a user computing device associated with the particular user.

At block 308, the controller 136 may receive property data identifying a geographical location from a PLO. The geographical location may be a PLO's property for which a project is desired. The location may be identified through an address of a particular property and/or other methods identifying a location with more specificity. In some embodiments, the user may provide an address to the restoration server 104 and the restoration server 104 may respond by providing a map (e.g., a satellite image map) of the address to the user. The user may then provide more detailed information on the location for which the project(s) is desired. The property data may also include information about the location itself, e.g., whether the property is adjacent to a stream.

At block 312, the controller 136 may identify a project partner. If the user associated with the user data received at block 304 is the PLO, the project partner may be a project coordinator. Conversely, if the user associated with the user data received at block 304 is the project coordinator, the project partner may be the PLO.

In embodiments where the user is the PLO and the project partner is the project coordinator, the controller 136 may utilize the property data and the resource GIS layer to identify a list of local project coordinators (hereinafter "local coordinators"), e.g., project coordinators that serve the designated geographical location. This list may be provided to the PLO for selection. As an alternative, the controller 136 may assign a local coordinator at the PLO's request.

The controller 136 may follow selection of a local coordinator with a generation and transmission of an invitation to determine whether the local coordinator desires to participate in the project. The invitation may be sent to the local coordinator as a direct electronic message, e.g., email. The local coordinator may accept the invitation and be associated with the project. If the selected local coordinator declines the invitation, alternative local coordinators may be selected with invitations being generated and transmitted until a local coordinator is associated with the project.

At block 316, the controller 136 may receive project details from the PLO, the local coordinator, and/or the project GIS layer. The receipt of the project details may include a number of request and response interactions between the controller 136 and various users designed to provide the relevant information for project implementation.

Figure 4:
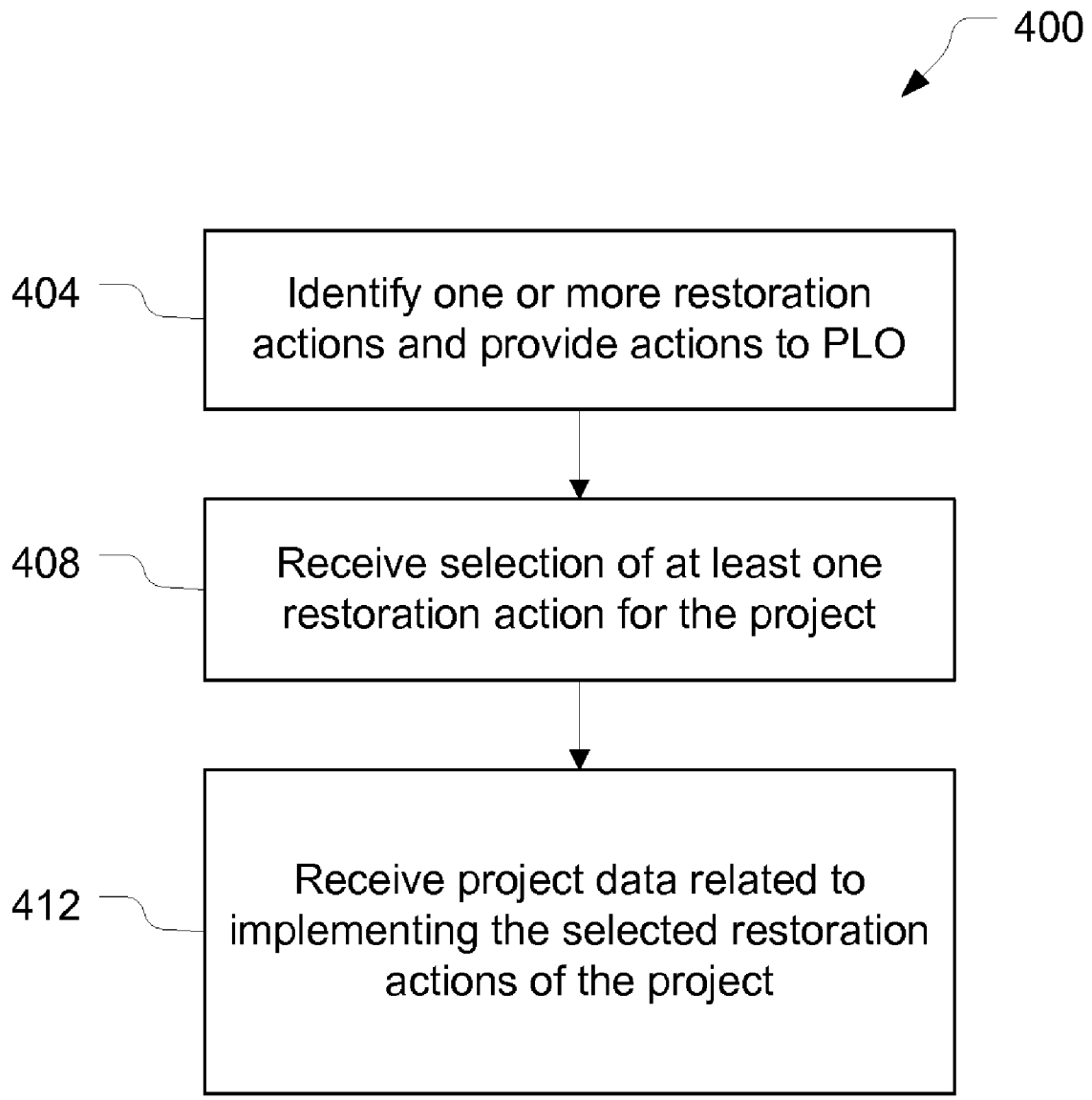
FIG. 4 is an operational flowchart illustrating operations involved with receiving project details from a PLO in accordance with various embodiments of the present invention.

FIG. 4 is an operational flowchart 400 illustrating operations involved with receiving project details from a PLO in accordance with various embodiments of the present invention. At block 404, the controller 136 may identify one or more restoration actions and provide the actions to the PLO in a selectable manner.

In some embodiments the identified restoration actions may be a comprehensive list of actions recognized as addressing limiting factors that may exist in a watershed. In other embodiments, the identified restoration actions may be tailored to the specific limiting factors identified in the geographical location. These tailored restoration actions may be accessed via the project GIS layer.

In some embodiments, funding criteria may be factored into identification of the restoration actions. For example, one embodiment may only provide funded restoration actions to the PLO for selection. In another embodiment, an indication of the level of funding of restoration actions (e.g., none, lightly funded, heavily funded, etc.) may be provided along with the restoration actions.

The restoration actions may be provided to the PLO in a number of categories, e.g., general restoration, instream work, reconnect habitats, road improvements, etc.

At block 408, the controller 136 may receive a selection of at least one of the restoration actions for the project and, afterwards at block 412, may receive project data related to implementing the selected restoration actions of the project. For example, in one embodiment the PLO may select a "Riparian Fencing" action under the general restoration category. The controller 136 may then transmit a series of queries to procure information relevant to a riparian fencing action, e.g., whether livestock enter the riparian zone, the amount of fencing needed, the setback of the fencing, the type of fencing, etc. While soliciting this information, the controller 136 may also encourage implementation details that increase environmental benefits by providing the user with associated funding incentives. For example, "A setback of x number of feet will be funded y %."

The controller 136 may also generate and transmit a series of queries to procure information relevant to PLO contributions, e.g., labor, materials, etc.

In some embodiments, the project details may additionally/alternatively include PLO's desired restoration actions and/or objectives. This input may be used directly in selection of possible restoration actions and/or as supplemental information for subsequent project process operations.

Figure 5:
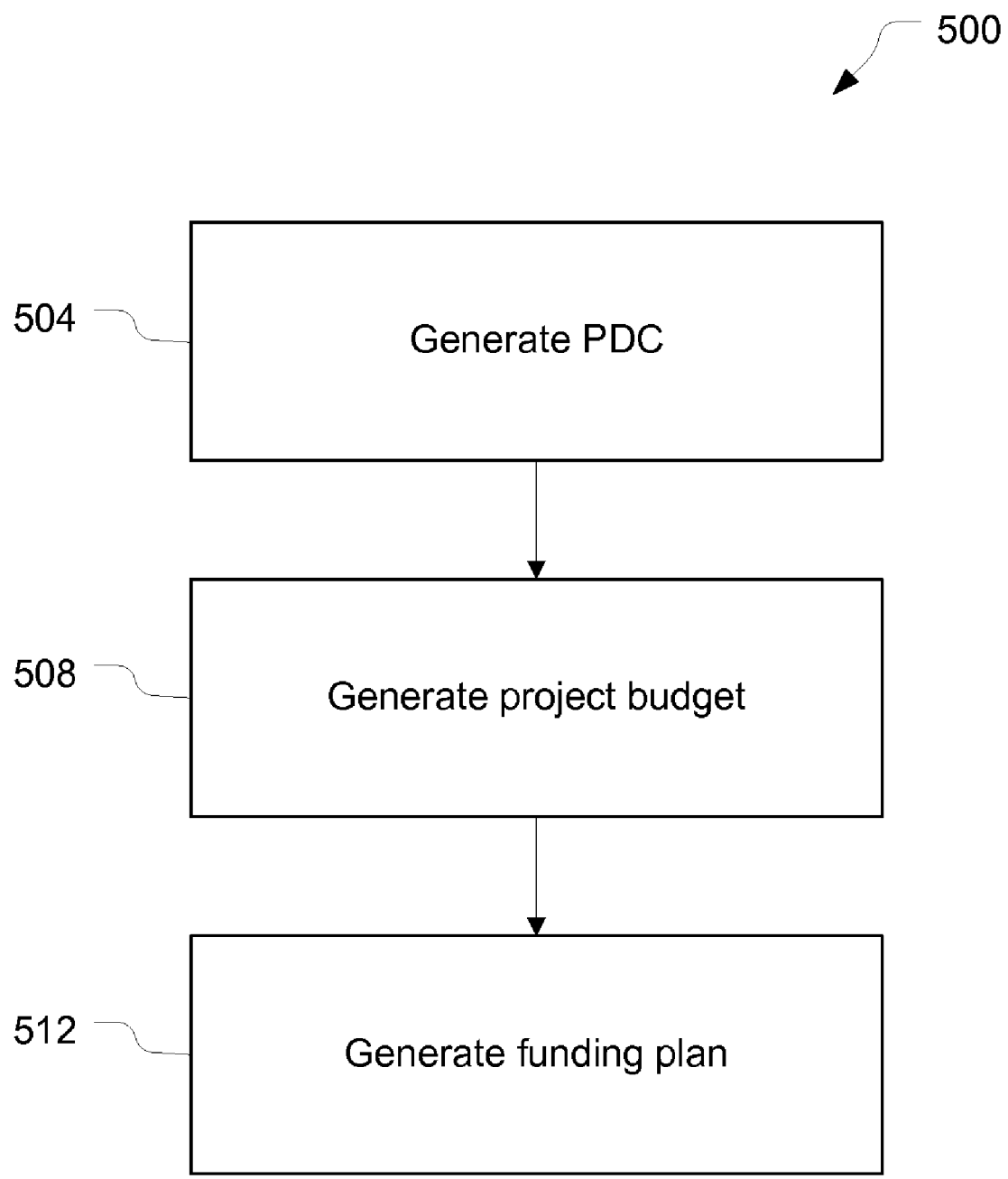
FIG. 5 is an operational flowchart illustrating generation of project design criteria, a project budget, and a funding plan in accordance with various embodiments of the present invention.

Referring again to FIG. 3, at block 320 the controller 136 may generate a project design criteria (PDC), a project budget, and a funding plan and provide these generated elements to the PLO/local coordinator. FIG. 5 is an operational flowchart 500 illustrating generation of PDC, a budget, and a funding plan in accordance with various embodiments.

At block 504, the controller 136 may generate the PDC based at least in part on the selected restoration actions of a particular project. The PDC may provide criteria for designing and/or implementing the selected restoration actions. For example, a PDC associated with riparian fencing may include criteria such as, but not limited to, fence placement allows for lateral movement of stream, vegetation removal is minimized, fencing is not used to create livestock handling facilities or riparian pastures, etc.

The PDC may also include criteria related to monitoring, managing, and/or documenting, various phases of the project. For example, a PDC for riparian fencing may recite a photo monitoring criteria that calls for photos of the project site before, periodically throughout, and after installation of the fencing.

In some embodiments, the PDC may be generically configured towards a restoration action. In other embodiments, the PDC may be configured based at least in part on the project details provided by the PLO for implementing the restoration action at the selected geographical location.

At block 508, the controller 136 may generate a project budget that includes an estimate for design and/or implementation of the selected restoration actions of the project. In some embodiments, the controller 136 may access resource information through the resource GIS layer to determine local cost estimates associated with the restoration actions. In other embodiments, general (or average) resource estimates may be used and updated with local information at a later time.

At block 512, the controller 136 may generate a funding plan for design and/or implementation of the selected restoration actions of the project and provide the funding plan to the PLO. The funding plan may identify funds from at least one funding source that can be allocated to designing and/or implementing the selected action. The funding plan may be based at least in part on the project budget and fund information stored in the fund database 124. The controller 136 may access the fund information through the fund GIS layer to identify funding sources having geographical funding criteria satisfied by the geographical location of the project. The other funding criteria of the funding sources may also be cross-referenced against the selected restoration actions and associated project details to identify the type and amount of funds (both individually and aggregate) that may be allocated towards the project.

In some embodiments, the funding plan may include which funds may be allocated to each watershed restoration action of the project. This may provide the PLO with information as to which of the selected actions have the greatest funding, which may have a bearing on which actions the PLO decides to pursue.

In some embodiments, identification of funds that may be allocated towards a particular project may be done to increase the total amount of allocated funds. This may include, e.g., allocating funds based on matching components in order to properly leverage matched funds. This may also include utilization of a prioritization protocol to rank funding sources according to associated expiration dates.

In some embodiments, the controller 136 may automatically identify the funds that may be allocated to a particular project.

As used herein, "automatic" may mean without manual intervention. It may be noted, however, that the controller 136 may be preprogrammed to generate one or more messages to users of the user computing devices 108 to acquire the information for said automated process. User response to these generated messages may not constitute manual intervention in the automated process of the controller 136.

The generated project budget and funding plan may be provided to the PLO for approval.

Referring again to FIG. 3, at block 324 the controller 136 may generate a restoration project contract and facilitate electronic execution of the restoration project contract by the PLO (either directly or through the PLO's representative, e.g., the project coordinator). The restoration project contract may provide all the relevant terms of an agreement between the project partners and an entity operating the system 100 for funding and completion of the design and/or implementation of restoration actions of the project. If the project partners agree to the provided terms they may electronically execute the contract by providing the controller 136 with one or more of their digital signatures, thereby manifesting a mutual assent to the terms.

At block 328, the controller 136 may facilitate engagement of design and/or implementation resources based at least in part on the resource information stored in the resource database 120 and the project details. The controller 136 may access the resource information via the resource GIS layer to determine which local resources are available for the project. The controller 136 may identify the local resources to the PLO/local coordinator and a number of request for proposals (RFPs) may be generated and transmitted. The responses to the RFPs may be reviewed by the PLO/local coordinator and selections may be made.

The details of the engagement may be entered by the PLO/local coordinator and the project budget may be updated at block 332.

At block 336, the controller 136 may automatically generate permit applications directed to one or more regulatory agencies for approval. The controller 136 may determine which permit applications to prepare by accessing project information stored in the project database 128. This project information may be accessed through a project GIS layer to map the various restoration actions with the regulating agency governing that action for the given geographical location.

In some embodiments, the permit applications may be electronically transmitted to the appropriate regulatory agency, e.g., through email. In other embodiments, the permit applications may be printed out and manually transmitted through a postal service. Similarly, the permit resulting from the permit application may be received electronically or through a postal service. If the permit is received through a postal service, an indication of the permit being received may be uploaded to the restoration server 104. This may be done through a user inputting a permit number and/or scanning the permit itself.

While the above embodiment discusses generation and completion of permit applications and receipt of approvals, other embodiments may provide permit notifications to appropriate agencies. A permit notification, for example, may provide the relevant agency with project information pursuant to a general authentication permit.

At block 340, the controller 136 may generate an invoice with the project details. The invoice may be provided to the PLO for review. Upon approval, the PLO may submit the invoice to the controller 136, which may, in turn, facilitate a distribution of the funds associated with the project. Upon distribution of the funds, the associated parties may begin the design and/or implementation phases of the project.

In some embodiments, invoicing (and associated disbursement) of the design and implementation phases may be performed separately. Furthermore, in some embodiments, invoicing (and associated disbursement) may take place in stages. For example, 90% of the hard costs may be invoiced/disbursed after the design phase is complete, the permits have been obtained, and the resources have been secured. The remaining 10% of the costs may be invoiced/disbursed upon completion and certification of the project. Other invoicing/distribution plans may be used in other embodiments.

Ecological outcomes may drive stakeholder involvement in collaborative watershed restoration projects. While the system 100 provides transparency to the projects that are being funded, stakeholder confidence may benefit from additional assurances provided through a certification that the projects are satisfactorily completed (e.g., in accordance with the associated PDCs). Therefore, in accordance with various embodiments of the invention, the restoration server 104 may facilitate project certification.

Figure 6:
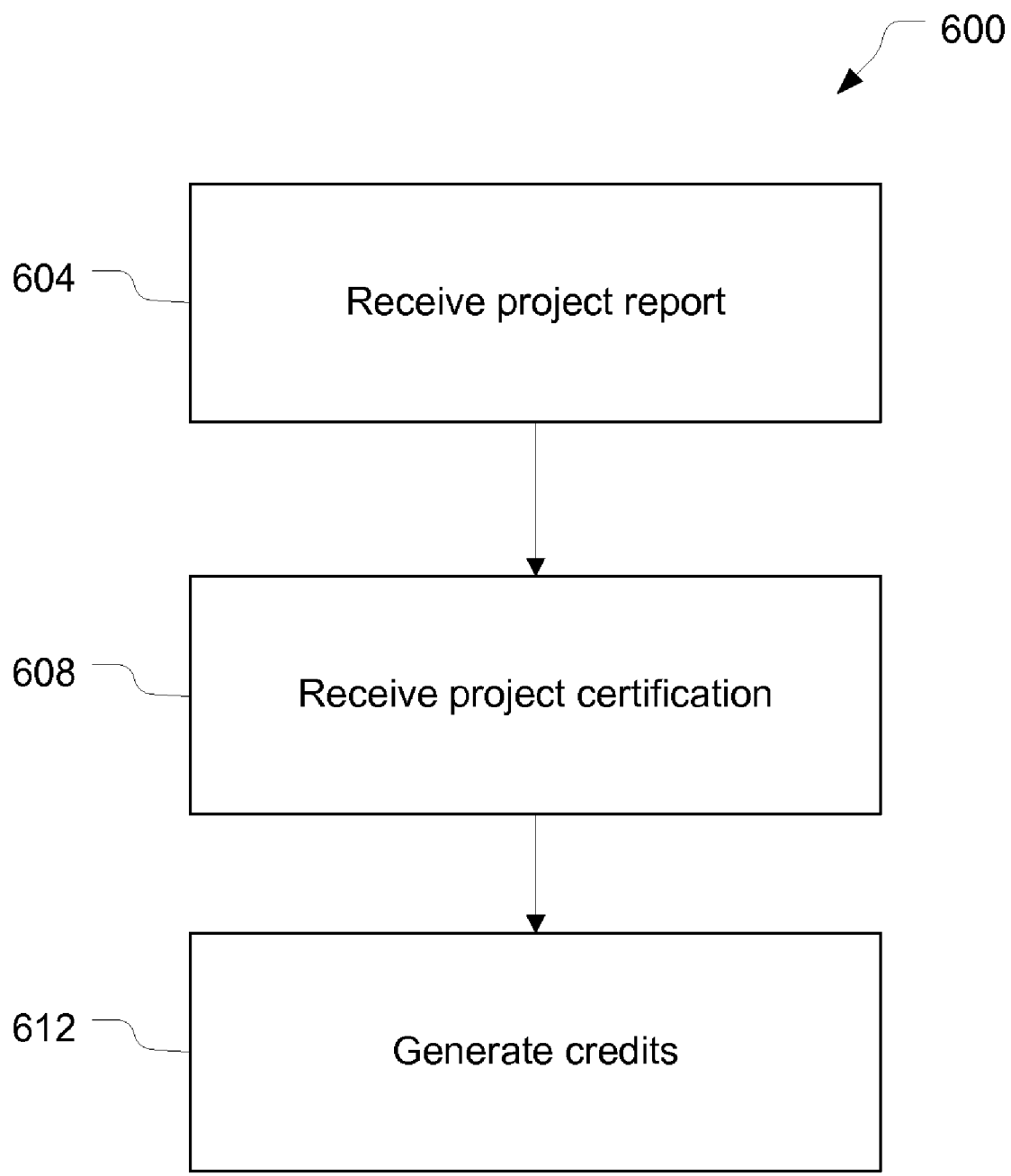
FIG. 6 is an operational flowchart illustrating a project certification process in accordance with various embodiments of the present invention.

FIG. 6 is an operational flowchart 600 illustrating a project certification process in accordance with various embodiments of the present invention. At block 604, the controller 136 may receive a project report. The project report may be an intermediate or final report entered by the PLO, the local coordinator, and/or a design and/or implementation resource (e.g., contractor, volunteer, etc.). The project report may detail progress on the restoration actions of the project. In some embodiments the project report may include periodic monitoring reports done in compliance with a monitoring plan that extends beyond the completion of the initial project work. This project report may account for the criteria of associated PDCs.

At block 608, the controller 136 may receive a project certification by a user authorized to provide such certifications, e.g., the local coordinator. This project certification may certify that the progress/outcomes detailed in the project report is a true and accurate account.

In some embodiments, the controller 136 may generate and transmit user reports based at least in part on these certified project reports. The user reports may provide a user with relevant, up-to-date information customized to that particular user. For example, in one embodiment the controller 136 may issue a user report to a funding source detailing the projects, and associated statuses, funded by that funding source. The user reports may be automatically generated and transmitted on a periodic basis and/or at the request of a user.

Upon receipt of the project certification, the controller 136 may generate one or more ecological restoration credits (hereinafter "credits") at block 612. The credits may represent a quantifiable ecological benefit that has occurred as a result of the project's completion. In some embodiments, each restoration action of a project may be associated with a certain number of credits based on any of a number of factors. These factors could include, e.g., contribution to the ecological health of a watershed; cost/difficulty of implementation; need; associated financial benefit to the PLO (e.g., a greater number of credits may be provided to projects having lower associated financial benefits, which are, therefore, less likely to be undertaken by the PLO); etc.

Credit definitions (e.g., the value of a credit and/or the number of credits allotted to a particular restoration action) may be compatible with standards promulgated by a third party certification body. In some embodiments, the third party certification body may provide periodic updates to the credit definitions. This may occur online through a user computing device 108 or offline.

These credits may be used in a variety of ways. Credits may be provided to funding sources as a return on investment and/or to other stakeholders. Credits may be used and exchanged in manners similar to any other type of tradable commodity.

In some embodiments, credits may be utilized in regulations under a particular administrative context, e.g., a cap and trade system, a baseline and credit system, an environmental remediation system, etc.

Figure 7:
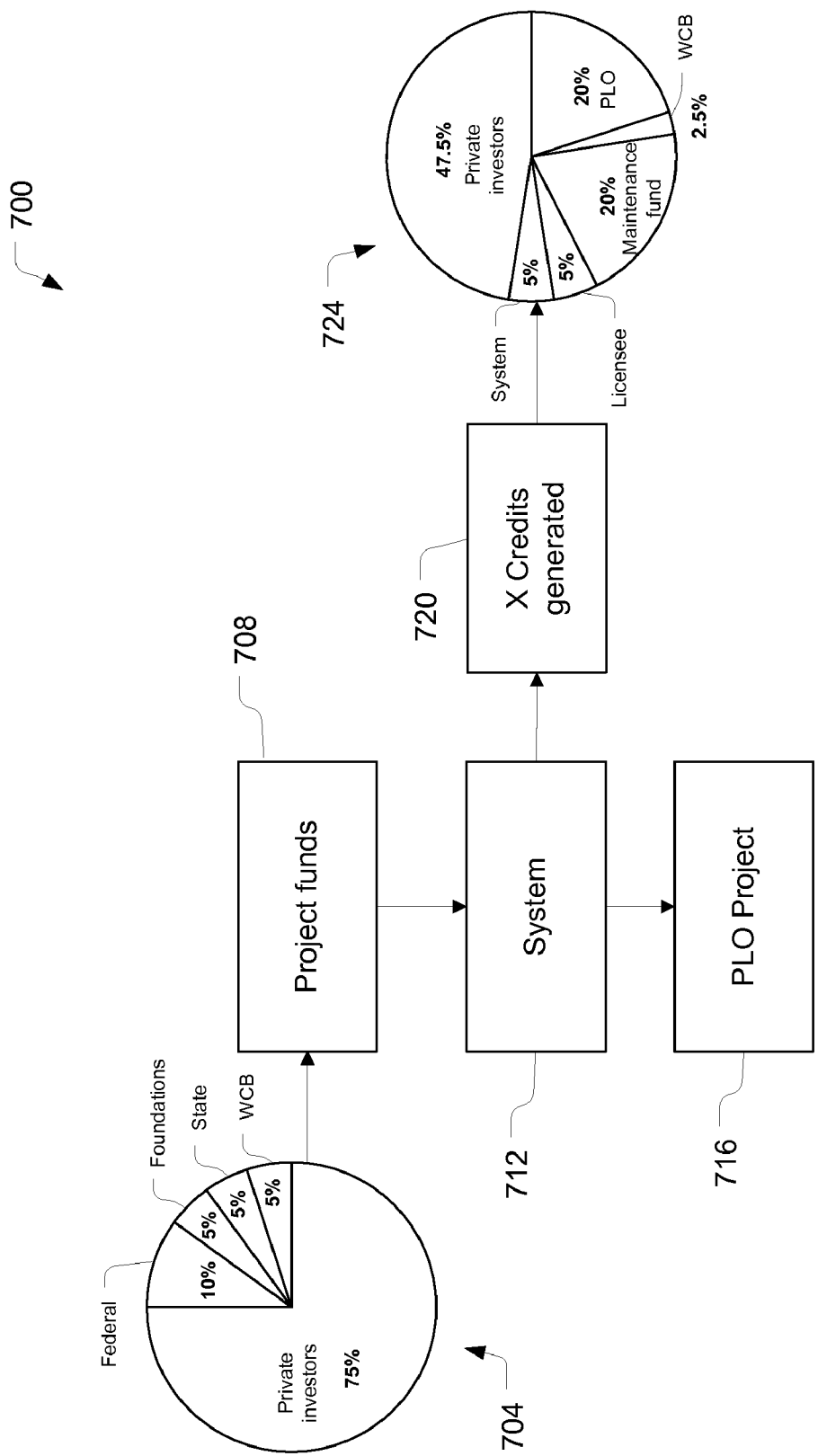
FIG. 7 is a conceptual flowchart illustrating credit generation and distribution in accordance with various embodiments of the present invention.

FIG. 7 is a conceptual flowchart 700 illustrating credit generation and distribution in accordance with various embodiments of the present invention. Chart 704 illustrates a breakdown of funds contributed from particular funding sources in accordance with an embodiment. In this embodiment 75% of the funds may be contributed by private investment; 5% by a commodity broker, e.g., watershed credit broker (WCB); 5% by foundations; 5% by the state government; and 10% by the federal government.

Funds from these funding sources may compose the project funds 708 provided to the system 712, which may be similar to system 100. The system 712 may distribute funds to a PLO project 716 and, upon certification of completed restoration actions, generate x number of credits 720. The credits may be distributed among various stakeholders according to the chart 724 in accordance with some embodiments.

The distribution of credits according to chart 724 is 47.5% to private investors; 5% to an operator of the system 712; 5% to a licensee of the system 100; 20% to a maintenance fund (e.g., public and charitable money) for funding of ongoing projects; 2.5% to WCB; and 20% to the PLO.

As will be readily understood, the distributions represented by the charts 704 and 724 are merely an example of one embodiment, other values and/or stakeholders may be represented in other embodiments.

Figure 8:
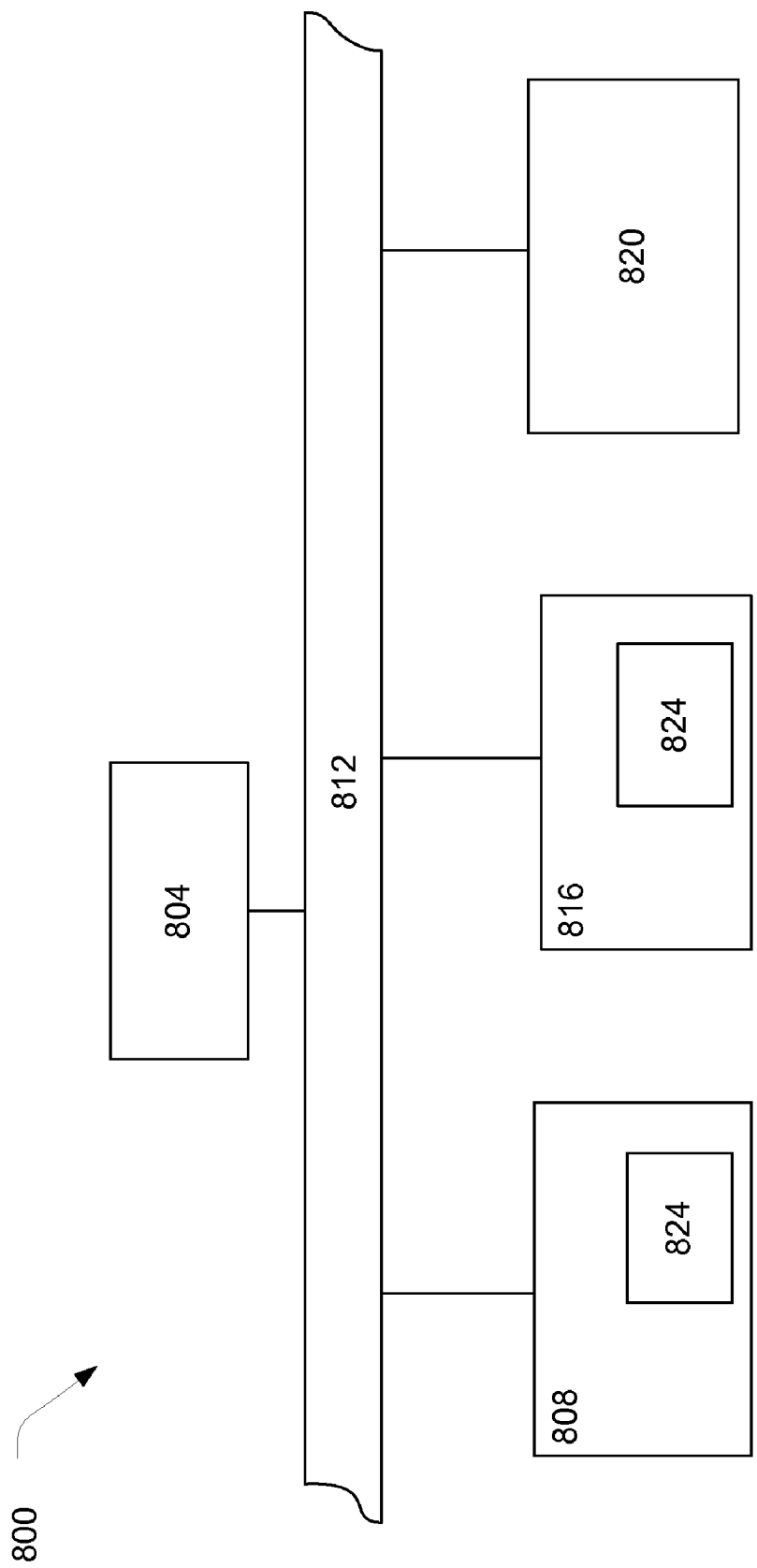
FIG. 8 illustrates a computing system capable of implementing a restoration server in accordance with various embodiments of the present invention.

FIG. 8 illustrates a computing system 800 capable of implementing the restoration server 104 in accordance with various embodiments. As illustrated, for the embodiments, computing system 800 includes processor 804, memory 808, and bus 812, coupled to each other as shown. Additionally, computing system 800 includes storage 816, and communication interfaces 820, e.g., a network interface card (NIC), coupled to each other, and the earlier described elements as shown.

Memory 808 and storage 816 may include, in particular, temporal and persistent copies of project logic 824, respectively. The project logic 824 may include instructions that when executed by the processor 804 result in the various project process performed by a restoration server as described herein.

In various embodiments, the memory 808 may include random access memory (RAM), dynamic RAM (DRAM), static RAM (SRAM), synchronous DRAM (SDRAM), dual-data rate RAM (DDRRAM), etc.

In various embodiments, the processor 804 may include one or more single-core processors, multiple-core processors, controllers, application-specific integrated circuits (ASICs), etc.

In various embodiments, storage 816 may be a machine-accessible medium that includes integrated and/or peripheral storage devices, such as, but not limited to, disks and associated drives (e.g., magnetic, optical), universal serial bus (USB) storage devices and associated ports, flash memory, read-only memory (ROM), nonvolatile semiconductor devices, etc.

In various embodiments, storage 816 may be a storage resource physically part of the computing system 800 or it may be accessible by, but not necessarily a part of, the computing system 800. For example, the storage 816 may be accessed by the system 800 over a network via the communication interfaces 820.

In various embodiments, computing system 800 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   receiving, from a user computing device, data identifying a geographical location;
   identifying one or more watershed restoration actions for the geographical location based at least in part on factors identified as limiting watershed recovery;
   providing the user computing device with the one or more watershed restoration actions in a selectable manner;
   receiving, from the user computing device, a selection of at least one watershed restoration action from the one or more watershed restoration actions;
   receiving, from the user computing device, project data related to implementing the at least one watershed restoration action at the geographical location;
   providing an estimate of project costs for designing and/or implementing the at least one watershed restoration action based at least in part on the project data;
   automatically identifying funds from at least one funding source of one or more funding sources that can be allocated to designing and/or implementing the at least one watershed restoration action based at least in part on the project data and the funding criteria of the at least one funding source; and
   providing an indication, to the user computing device, of the identified funds, including which funds can be allocated to each watershed restoration action of the at least one watershed restoration action.

2. The method of claim 1, wherein said receiving project data occurs after said receiving the selection of the at least one watershed restoration action.

3. The method of claim 1, wherein the one or more watershed restoration actions include an invasive weed removal action, an instream work restoration action, and/or a habitat reconnection restoration action.

4. The method of claim 3, further comprising:
   generating at least one layer of a geographical information system (GIS) to correlate local resources to various geographical locations; and
   identifying one or more local resources to facilitate design and/or implementation of the at least one watershed restoration action based at least in part on the at least one layer of the GIS.

5. The method of claim 2, further comprising:
   automatically generating one or more completed permit applications directed to one or more regulatory agencies for approval of the at least one watershed restoration action based at least in part on the project data.

6. The method of claim 2, further comprising:
   generating project design criteria for the at least one watershed restoration action; and
   receiving, from another user computing device associated with a project coordinator, a certification that the at least one watershed restoration action is completed in accordance with the project design criteria.

7. The method of claim 6, further comprising:
   generating one or more restoration credits based at least in part on the at least one watershed restoration action and on said receiving of the certification.

8. The method of claim 6, further comprising:
   generating a user report to provide a user with information on a status of the at least one watershed restoration action based at least in part on said receiving of the certification; and
   transmitting the user report to the user.

9. The method of claim 2, further comprising:
   identifying one or more project coordinators based at least in part on the geographical location;
   selecting a project coordinator from the one or more project coordinators;
   generating a restoration project contract based at least in part on the project data; and
   facilitating electronic execution of a restoration project contract by a landowner of the geographical location.

10. The method of claim 1, wherein said identifying of one or more watershed restoration actions is based at least in part on factors identified as limiting watershed recovery and funding criteria of one or more funding sources and the method further comprises:
    generating a first layer of a geographical information system (GIS) to correlate factors identified as limiting watershed recovery to various geographical locations; and
    identifying the one or more watershed restoration actions based at least in part on the geographical location and the first layer of the GIS.

11. The method of claim 10, further comprising:
    generating a second layer of the GIS to correlate the funding criteria of the one or more funding sources to various geographical locations; and
    identifying the one or more watershed restoration actions based at least further in part on the second layer of the GIS.

12. An apparatus comprising:
    a geographical information system (GIS) to correlate factors identified as limiting watershed recovery and funding criteria of one or more funding sources to various geographical locations; and
    a controller coupled to the GIS and configured
       to receive data identifying a geographical location from a user computing device, to identify one or more watershed restoration actions for the geographical location based at least in part on the factors identified as limiting watershed recovery, to provide the user computing device with the one or more watershed restoration actions in a selectable manner, to receive, from the user computing device, a selection of at least one watershed restoration action from the one or more watershed restoration actions, and to receive, from the user computing device, project data related to implementing the at least one watershed restoration action.

13. The apparatus of claim 12, wherein the controller is further configured to receive the project data after receiving the selection of the at least one watershed restoration action.

14. The apparatus of claim 13, wherein the controller is further configured to provide an estimate of project costs for designing and/or implementing the at least one watershed restoration action, automatically identify funds from at least one funding source of the one or more funding sources that can be allocated to the designing and/or implementing of the at least one watershed restoration action based at least in part on funding criteria of the at least one funding source, and to provide an indication of the identified funds, including which funds may be allocated to each watershed restoration action of the at least one watershed restoration action.

15. The apparatus of claim 14, wherein the controller is configured to identify funds based at least in part on matching fund components of a first funding source of the at least one funding source.

16. The apparatus of claim 13, wherein the GIS includes a first layer to correlate factors identified as limiting watershed recovery to various geographical locations, a second layer to correlate funding criteria of the one or more funding sources to various geographical locations, and a third layer to correlate local resources for design and/or implementation of watershed restoration actions to various geographical locations.

17. An apparatus comprising:

a fund database configured to store fund information on funds from a plurality of funding sources allocated towards watershed restoration actions that satisfy provided funding criteria from each of the plurality of funding sources;

a project database configured to store project information on watershed restoration actions; and a controller configured to receive user information, from a user computing device, including a geographical location, at least one desired watershed restoration action, and project data related to implementing the at least one desired watershed restoration action, and to automatically identify funds from at least one funding source of the plurality of funding sources based at least in part on the fund information, the project information, and the user information and provide an indication to the user computing device of the identified funds, including which funds can be allocated to each watershed restoration action of the at least one desired watershed restoration action.

18. The apparatus of claim 17, wherein the provided funding criteria includes matching fund components, landowner eligibility, geographical location eligibility, and/or watershed restoration action eligibility, and the controller is further configured to automatically identify funds based at least in part on the provided funding criteria.

19. The apparatus of claim 17, wherein the controller is further configured to provide project design criteria to the user computing device based at least in part on the project information; and to facilitate certification, from a local coordinator, that a design and/or implementation of the watershed restoration action complies with the project design criteria.

\* \* \* \* \*